United States Patent
Kim et al.

(10) Patent No.: US 12,204,198 B2
(45) Date of Patent: Jan. 21, 2025

(54) POLARIZING PLATE LAMINATE AND METHOD FOR PREPARING SAME

(71) Applicant: LG CHEM, LTD., Seoul (KR)

(72) Inventors: Do Hyun Kim, Daejeon (KR); Sung Wook Jeon, Daejeon (KR); Dae Hee Lee, Daejeon (KR); Seung Kyu Park, Daejeon (KR); Youngjin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 571 days.

(21) Appl. No.: 17/609,635

(22) PCT Filed: Oct. 22, 2020

(86) PCT No.: PCT/KR2020/014489
§ 371 (c)(1),
(2) Date: Nov. 8, 2021

(87) PCT Pub. No.: WO2021/085933
PCT Pub. Date: May 6, 2021

(65) Prior Publication Data
US 2022/0229330 A1    Jul. 21, 2022

(30) Foreign Application Priority Data
Oct. 31, 2019   (KR) .................... 10-2019-0137106

(51) Int. Cl.
*G02B 5/30* (2006.01)
*B32B 7/023* (2019.01)
(Continued)

(52) U.S. Cl.
CPC ........ *G02F 1/133528* (2013.01); *B32B 7/023* (2019.01); *B32B 7/06* (2013.01);
(Continued)

(58) Field of Classification Search
CPC ..... G02F 1/133528; B32B 7/023; B32B 7/06; B32B 7/12; B32B 27/365; B32B 37/003;
(Continued)

(56) References Cited

U.S. PATENT DOCUMENTS

| 9,841,545 B2 | 12/2017 | Mizutani et al. |
| 2002/0015807 A1 | 2/2002 | Sugino et al. |

(Continued)

FOREIGN PATENT DOCUMENTS

| CN | 101907737 A | 12/2010 |
| CN | 103969732 A | 8/2014 |

(Continued)

*Primary Examiner* — Euncha P Cherry
(74) *Attorney, Agent, or Firm* — Bryan Cave Leighton Paisner LLP

(57) ABSTRACT

A polarizing plate laminate according to an exemplary embodiment of the present disclosure includes: a polarizing plate; a first adhesive layer and a first separate film which are provided on one surface of the polarizing plate; and a second adhesive layer and a second separate film which are provided on the other surface of the polarizing plate, in which the second separate film has a total thickness of more than 75 μm and 150 μm or less.

11 Claims, 3 Drawing Sheets

(51) Int. Cl.
  *B32B 7/06* (2019.01)
  *B32B 7/12* (2006.01)
  *B32B 27/36* (2006.01)
  *B32B 37/00* (2006.01)
  *B32B 37/12* (2006.01)
  *G02F 1/1335* (2006.01)
  *B32B 37/26* (2006.01)

(52) U.S. Cl.
  CPC .............. *B32B 7/12* (2013.01); *B32B 27/365* (2013.01); *B32B 37/003* (2013.01); *B32B 37/12* (2013.01); *B32B 2037/268* (2013.01); *B32B 2250/03* (2013.01); *B32B 2250/04* (2013.01); *B32B 2307/42* (2013.01); *B32B 2307/732* (2013.01); *B32B 2457/202* (2013.01)

(58) Field of Classification Search
  CPC .............. B32B 37/12; B32B 2037/268; B32B 2250/03; B32B 2250/04; B32B 2307/42; B32B 2307/732; B32B 2457/202; B32B 2605/006; B32B 27/08; B32B 27/36; B32B 37/206; B32B 2307/416; G02B 1/04; G02B 5/30; G02B 5/3041
  See application file for complete search history.

(56) References Cited

U.S. PATENT DOCUMENTS

| | | |
|---|---|---|
| 2007/0195244 A1 | 8/2007 | Miyatake et al. |
| 2008/0278690 A1 | 11/2008 | Maeda et al. |
| 2009/0122401 A1 | 5/2009 | Shinagawa et al. |
| 2012/0206804 A1 | 8/2012 | Nam et al. |
| 2013/0170035 A1 | 7/2013 | Jung et al. |
| 2013/0258481 A1 | 10/2013 | Fukuda et al. |
| 2014/0085722 A1 | 3/2014 | Yasui et al. |
| 2015/0346408 A1* | 12/2015 | Mizutani ................. B32B 37/26 428/41.5 |
| 2016/0209566 A1* | 7/2016 | Yasui ................... G02B 5/3033 |
| 2020/0393603 A1 | 12/2020 | Lee et al. |

FOREIGN PATENT DOCUMENTS

| | | |
|---|---|---|
| CN | 106324741 A | 1/2017 |
| CN | 107635764 A | 1/2018 |
| JP | 10-44284 A | 2/1998 |
| JP | 2001-108826 A | 4/2001 |
| JP | 2001-305348 A | 10/2001 |
| JP | 2009-075476 A | 4/2009 |
| JP | 2009-120711 A | 6/2009 |
| JP | 2013-228720 A | 11/2013 |
| JP | 2014-122984 A | 7/2014 |
| JP | 2014-126598 A | 7/2014 |
| JP | 2016035046 | 3/2016 |
| JP | 2016-80830 A | 5/2016 |
| JP | 2016-118776 A | 6/2016 |
| JP | 2016-136238 A | 7/2016 |
| JP | 2018022135 | 2/2018 |
| KR | 10-0679535 B1 | 1/2007 |
| KR | 10-2009-0101763 A | 9/2009 |
| KR | 10-2011-0002676 A | 1/2011 |
| KR | 10-2013-0077702 A | 7/2013 |
| KR | 20150048220 A | 5/2015 |
| KR | 20150050063 A | 5/2015 |
| KR | 10-2015-0120264 A | 10/2015 |
| KR | 10-2016-0074399 A | 6/2016 |
| KR | 10-2017-0054403 A | 5/2017 |
| KR | 10-1864095 B1 | 5/2018 |
| KR | 10-2018-00118239 A | 10/2018 |
| KR | 20190072151 A | 6/2019 |
| TW | 2007-17031 A | 5/2007 |
| TW | 200922979 A | 6/2009 |
| WO | 2017/057223 A1 | 4/2017 |
| WO | 2017-104463 A1 | 6/2017 |

* cited by examiner

[Figure 1]

| 30 |
|---|
| 20 |
| 10 |
| 40 |
| 50 |

[Figure 2]

| 30 |
|---|
| 20 |
| 10 |
| 40 |
| 50 |
| 50 |

[Figure 3]
<EXAMPLE 1>
<COMPARATIVE EXAMPLE 1>
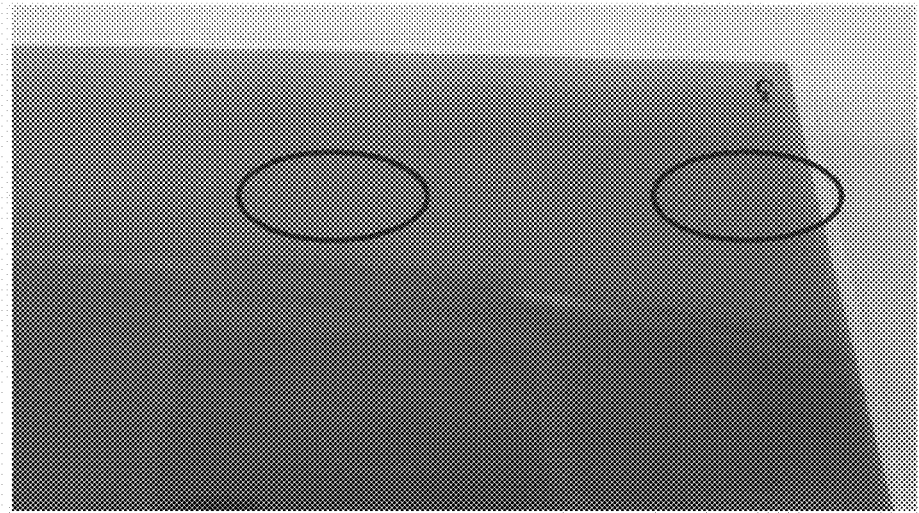

[Figure 4]

| | |
|---|---|
| 60 | |
| 10 | |
| 70 | |

POLARIZING PLATE LAMINATE AND METHOD FOR PREPARING SAME

CROSS-REFERENCE TO RELATED APPLICATIONS

This application is a National Phase entry pursuant to 35 U.S.C. § 371 of International Application No. PCT/KR2020/014489 filed on Oct. 22, 2020, and claims priority to and the benefits of Korean Patent Application No. 10-2019-0137106, filed with the Korean Intellectual Property Office on Oct. 31, 2019, the entire contents of which are incorporated by reference in their entirety for all purposes as if fully set forth herein.

TECHNICAL FIELD

The present application relates to a polarizing plate laminate and a method for manufacturing thereof.

BACKGROUND ART

A liquid crystal display device is one of the flat panel displays which have been widely used from mobile phones or portable small electronic devices to large electronic devices such as personal computers or televisions, and whose use is gradually expanding.

As the use of display devices has expanded, the places where the display devices are placed and their positions have become diversified, but the flat panel display has a problem in that a clear image cannot be obtained when viewed from another direction rather than the front of the display. In particular, a display for a vehicle has a problem in that a clear image cannot be obtained from the driver's visual field because the position of the display and the line of sight of the driver are not parallel.

Therefore, in order to solve these problems, there is a need for developing a display device capable of improving the viewing angle and the contrast ratio.

DISCLOSURE

Technical Problem

The present application has been made in an effort to provide a polarizing plate laminate and a method for manufacturing thereof.

Technical Solution

An exemplary embodiment of the present application provides a polarizing plate laminate comprising:
a polarizing plate;
a first adhesive layer and a first separate film which are provided on one surface of the polarizing plate; and
a second adhesive layer and a second separate film which are provided on the other surface of the polarizing plate,
in which the second separate film has a total thickness of more than 75 μm and 150 μm or less.

Further, another exemplary embodiment of the present application provides a method for manufacturing a polarizing plate laminate, the method comprising:
applying a first adhesive layer to one surface of a polarizing plate and applying a second adhesive layer to the other surface thereof; and
laminating a first separate film on the first adhesive layer and laminating a second separate film on the second adhesive layer,
in which the second separate film has a total thickness of more than 75 μm and 150 μm or less.

Advantageous Effects

The polarizing plate laminate according to an exemplary embodiment of the present application can prevent defects such as the sagging phenomenon of a polarizing plate during a process of attaching a liquid crystal panel or optical film of a liquid crystal display device to the polarizing plate by comprising a second separate film having a total thickness of more than 75 μm and 150 μm or less.

Therefore, it is possible to suppress a phenomenon in which bubbles can be generated on the bonding surface between the liquid crystal panel or optical film of the liquid crystal display device and the polarizing plate during the process of attaching the liquid crystal panel or optical film of the liquid crystal display device to the polarizing plate.

DESCRIPTION OF DRAWINGS

FIGS. 1 and 2 are views each schematically illustrating a polarizing plate laminate according to an exemplary embodiment of the present application.

FIG. 3 is a view illustrating the results of attaching the optical film to the polarizing plate according to Example 1 and Comparative Example 1 of the present application.

FIG. 4 is a view schematically illustrating the structure of a polarizing plate in the related art.

EXPLANATION OF REFERENCE NUMERALS AND SYMBOLS

10: Polarizing plate
20: First adhesive layer
30: First separate film
40: Second adhesive layer
50: Second separate film
60: Protective film
70: separate film

DETAILED DESCRIPTION

Hereinafter, preferred exemplary embodiments of the present application will be described. However, the exemplary embodiments of the present application can be modified into various other forms, and the scope of the present application is not limited to the exemplary embodiments which will be described below. Further, the exemplary embodiments of the present application are provided to explain the present invention in more detail to a person with ordinary skill in the art.

Typically, a process of manufacturing a display device comprises a process of attaching a liquid crystal panel or optical film of a liquid crystal display device to a polarizing plate. In a process of attaching a liquid crystal panel or optical film of a liquid crystal display device to a polarizing plate in the related art, there can occur defects such as a polarizing plate sagging phenomenon between a roll operating for the attachment process and a table on which the polarizing plate is placed. Accordingly, in the process of attaching the liquid crystal panel or optical film of the liquid crystal display device to the polarizing plate, a phenomenon in which air bubbles continuously accumulate on the bonding surface can occur, which causes defects to continuously occur, so that there is a problem in that mass production cannot be achieved.

Thus, the present application is intended to suppress the generation of air bubbles, which can occur due to the sagging of a polarizing plate in a process of attaching a liquid crystal panel or optical film of a liquid crystal display device to the polarizing plate.

A polarizing plate laminate according to an exemplary embodiment of the present application comprises: a polarizing plate; a first adhesive layer and a first separate film which are provided on one surface of the polarizing plate; and a second adhesive layer and a second separate film which are provided on the other surface of the polarizing plate, in which the second separate film has a total thickness of more than 75 µm and 150 µm or less.

Further, a method for manufacturing a display device according to an exemplary embodiment of the present application comprises: applying a first adhesive layer to one surface of a polarizing plate and applying a second adhesive layer to the other surface thereof; and laminating a first separate film on the first adhesive layer and laminating a second separate film on the second adhesive layer, wherein the second separate film has a total thickness of more than 75 µm and 150 µm or less.

In an exemplary embodiment of the present application, the first separate film and the second separate film are films which are temporarily attached to protect the surface of the polarizing plate until the polarizing plate is bonded to the liquid crystal panel or another optical member.

The first separate film can have a thickness of 10 µm to 75 µm.

The second separate film can have a single-layered structure or a multi-layered structure. The second separate film can have a total thickness of more than 75 µm and 150 µm or less, 80 µm to 150 µm, and 90 µm to 140 µm. When the second separate film has a total thickness of 75 µm or less, defects such as a sagging phenomenon of a polarizing plate can occur during a process of attaching a liquid crystal panel or optical film of a liquid crystal display device to the polarizing plate, and when the second separate film has a total thickness of more than 150 µm, defects can occur during a process of peeling the second separate film. Accordingly, when the second separate film has a total thickness of more than 75 µm and 150 µm or less, it is possible to effectively prevent defects such as the sagging phenomenon of a polarizing plate during a process of attaching a liquid crystal panel or optical film of a liquid crystal display device to the polarizing plate.

The second separate film can have a single-layered structure or a double-layered structure. When the second separate film has a double-layered structure, as a second separate film (A) which directly contacts the polarizing plate, it is possible to apply a separate film having no adhesive characteristics on the surface thereof, and as a second separate film which does not directly contact the polarizing plate, it is possible to apply a separate film having adhesive characteristics on a surface attached to the second separate film (A).

The first separate film and the second separate film can each comprise one or more of a polyethylene-based resin such as polyethylene; a polypropylene-based resin such as polypropylene; a polyester-based resin such as polyethylene terephthalate or polyethylene naphthalate; and a polycarbonate-based resin.

In an exemplary embodiment of the present application, a first adhesive layer is provided between the first polarizing plate and the first separate film, and a second adhesive layer is provided between the polarizing plate and the second separate film. Accordingly, the first separate film can be attached by a first adhesive layer applied on one surface of the polarizing plate, and the second separate film can be attached by a second adhesive layer applied on the other surface of the polarizing plate.

The first adhesive layer and the second adhesive layer can comprise a general-purpose adhesive, and more specifically, can be composed of an adhesive composition comprising a resin such as a (meth) acrylic resin, a rubber-based resin, a urethane-based resin, an ester-based resin, a silicone-based resin, and a polyvinyl ether-based resin as a main component. Among them, an adhesive composition comprising a (meth) acrylic resin having excellent transparency, weatherability, heat resistance and the like as a base polymer is suitable. The adhesive composition can be an active energy ray-curable type or a thermosetting type.

In an exemplary embodiment of the present application, the laminating of the first separate film and the second separate film on the polarizing plate to which the first adhesive layer and the second adhesive layer are applied can be performed by a roll to roll process. A process of attaching a first separate film and a second separate film on the polarizing plate can be performed by a lamination process using a lamination roll after preparing the corresponding products wound on each roll.

Figures 1, 2:
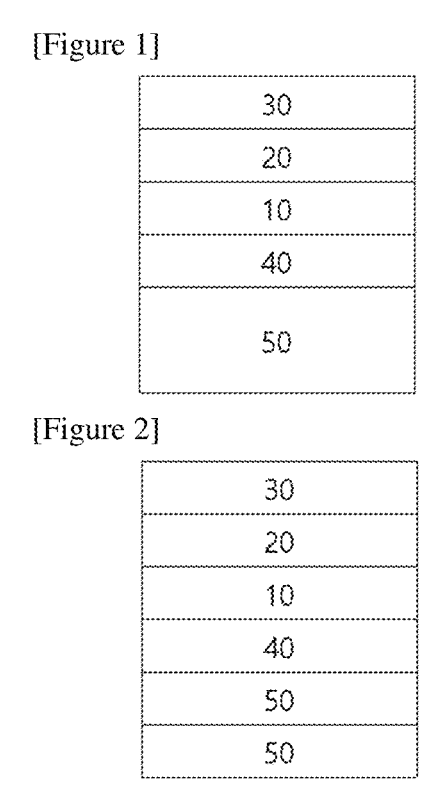

A polarizing plate laminate according to an exemplary embodiment of the present application is schematically illustrated in the following FIGS. 1 and 2. More specifically, the following FIG. 1 is a view illustrating a polarizing plate laminate comprising a first adhesive layer 20 and a first separate film 30 which are provided on one surface of a polarizing plate 10, and a second adhesive layer 40 and a second separate film 50 which are provided on the other surface of the polarizing plate 10. In this case, the second separate film 50 has a total thickness of more than 75 µm and 150 µm or less. Further, the following FIG. 2 is a view illustrating a polarizing plate laminate in which the second separate film 50 has a double-layered structure.

In an exemplary embodiment of the present application, a region where the second separate film is provided can be a region where the liquid crystal panel or optical film of the liquid crystal display device is disposed. That is, a liquid crystal display device manufactured using the polarizing plate laminate according to an exemplary embodiment of the present application can be manufactured by removing the second separate film of the polarizing plate laminate and attaching a liquid crystal panel or optical film to a surface from which the second separate film of the polarizing plate laminate is removed.

Figure 4:
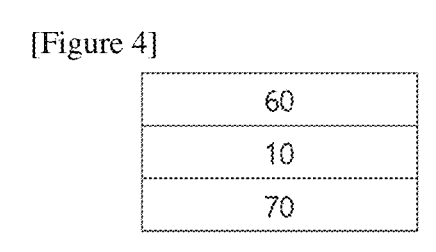

A general polarizing plate structure in the related art is schematically illustrated in the following FIG. 4. As illustrated in the following FIG. 4, the polarizing plate in the related art comprises a polarizing plate 10, a protective film 60 provided on one surface of the polarizing plate 10, and a separate film 70 provided on the other surface of the polarizing plate 10. A protective film 60 of a polarizing plate in the related art has a thickness of about 50 µm to 60 µm, and the protective film 60 served to stably control the curl of the polarizing plate.

However, the polarizing plate laminate according to an exemplary embodiment of the present application is a polarizing plate laminate in which in order to suppress a phenomenon in which air bubbles can be generated on a bonding surface of a liquid crystal panel or optical film of a liquid crystal display device and a polarizing plate during a process of attaching the liquid crystal panel or optical film of the liquid crystal display device to the polarizing plate, the thickness of a second separator film provided on a side opposite to the bonding surface is adjusted to more than 75 µm and 150 µm or less, and the polarizing plate laminate according to an exemplary embodiment of the present application is different from a polarizing plate in the related art in terms of structure and object thereof.

The method for manufacturing a polarizing plate laminate according to an exemplary embodiment of the present application can further comprise: removing the first separate film; and attaching a liquid crystal panel or optical film of a liquid crystal display device to the polarizing plate, such that a surface of the polarizing plate laminate from which the first separate film is removed is bonded to one surface of the liquid crystal panel or optical film.

The optical film can comprise one or more of an antiglare film, a hard coating film, an anti-reflection film, an Anti-Glare & Low-Reflection (AGLR) film, and the like, and is not limited thereto. The optical film can be manufactured by a method known in the art. Further, the optical film can be a polycarbonate film.

The method for manufacturing a polarizing plate laminate according to an exemplary embodiment of the present application can further comprise removing the second separate film after the attaching of the liquid crystal panel or optical film of the liquid crystal display device to the polarizing plate. After the removing of the second separate film, one or more of a liquid crystal panel, an optical film, and the like known in the art can be further attached, and can be provided on a liquid crystal panel, an optical film, and the like known in the art.

As described above, during a process of attaching a liquid crystal panel or optical film of a liquid crystal display device to a polarizing plate in the related art, stress due to the sagging of the polarizing plate occurs, and air bubbles can be generated when the film bending portion due to suction removal is attached to the liquid crystal panel or optical film. However, according to an exemplary embodiment of the present application, it is possible to prevent defects such as the sagging phenomenon of a polarizing plate during the process of attaching a liquid crystal panel or optical film of a liquid crystal display device to the polarizing plate by using a polarizing plate laminate comprising a second separate film having a total thickness of more than 75 µm and 150 µm or less.

In an exemplary embodiment of the present application, the polarizing plate can comprise a polarizer and a protective film on at least one surface of the polarizer.

The polarizer protective film can be a triacetate cellulose (TAC) film, a cycloolefin polymer (COP), an acrylic film, and the like, and is not limited thereto.

The polarizer is not particularly limited, and a polarizer well-known in the art, for example, a film composed of polyvinyl alcohol (PVA) comprising iodine or a dichroic dye can be used.

The polarizer exhibits a characteristic capable of extracting only light oscillating in one direction from light incident while oscillating in various directions. These characteristics can be achieved by stretching an iodine-absorbed polyvinyl alcohol (PVA) under high tension. For example, more specifically, a polarizer can be formed by a step of swelling a PVA film by immersing the PVA film in an aqueous solution, a step of dyeing the swollen PVA film with a dichroic substance imparting a polarization property to the swollen PVA film, a stretching step of arranging the dichroic dye substance in parallel with the stretching direction by stretching the dyed PVA film, and a color correcting step of correcting the color of the PVA film subjected to the stretching step. However, the polarizing plate of the present application is not limited thereto.

Further, another exemplary embodiment of the present application provides a liquid crystal display device manufactured by using the polarizing plate laminate. The liquid crystal display device can comprise a configuration known in the art, except for being manufactured by using the polarizing plate laminate according to an exemplary embodiment of the present application.

For example, the liquid crystal display device according to an exemplary embodiment of the present application can comprise: a liquid crystal panel; a first polarizing plate provided on the viewing side of the liquid crystal panel; a second polarizing plate provided on a side opposite to the viewing side of the liquid crystal panel; and a backlight unit provided on a side opposite to a surface of the second polarizing plate facing the liquid crystal panel. In this case, the first polarizing plate or second polarizing plate can be a polarizing plate laminate according to an exemplary embodiment of the present application. In addition, the liquid crystal panel can further comprise a separate polarizing plate instead of the polarizing plate laminate according to an exemplary embodiment of the present application, and in this case, the polarizing plate further comprised can be a polarizing plate known in the art.

In the present application, the term "viewing side" means a surface or direction arranged so as to face the viewer side when a polarizing plate is mounted to a display device such as a liquid crystal display device. In contrast, the "side opposite to the viewing side" means a side opposite to the viewer, that is, a surface or direction arranged so as to face a backlight unit when a polarizing plate is mounted on a display device such as a liquid crystal display device.

In an exemplary embodiment of the present application, the liquid crystal display device can be a liquid crystal display device for a vehicle.

MODE FOR INVENTION

Hereinafter, exemplary embodiments described in the present specification will be exemplified through Examples. However, the scope of the exemplary embodiments is not intended to be limited by the following Examples.

EXAMPLES

Example 1

After an adhesive (LG Chem, highly durable adhesive) was applied to both surfaces of a polarizing plate (LG Chem, highly durable polarizing plate), a first separate film (polyethylene terephthalate, PET) was laminated on one surface of the polarizing plate, and a second separate film (polyethylene terephthalate, PET) was laminated on the other surface of the polarizing plate using a roll to roll process. Further, as the first separate film, a single-layered film having a thickness of 38 µm, manufactured by Mitsubishi Corporation, was used, and as the second separate film, a single-layered film having a thickness of 93 µm, manufactured by LG Chem, was used.

After the first separate film of the polarizing plate was removed, the polycarbonate film was laminated with the polarizing plate (using a lamination facility manufactured by Taechang), such that a surface of the polarizing plate from which the first separate film was removed was bonded to one surface of a polycarbonate film (Shinetech Co.). The lamination speed during the lamination process was 400 mm/min.

Example 2

A process was performed in the same manner as in Example 1, except that as the second separate film, a double-layered film having a total thickness of 131 μm was used by laminating a single-layered film (Mitsubishi) having a thickness of 38 μm with a single-layered film (LG Chem) having a thickness of 93 μm.

Example 3

A process was performed in the same manner as in Example 1, except that as the second separate film, a double-layered film having a total thickness of 143 μm was used by laminating a single-layered film (Mitsubishi) having a thickness of 50 μm with a single-layered film (LG Chem) having a thickness of 93 μm.

Comparative Example 1

A process was performed in the same manner as in Example 1, except that as the second separate film, a single-layered film (Mitsubishi) having a thickness of 38 μm was used.

Comparative Example 2

A process was performed in the same manner as in Example 1, except that as the second separate film, a single-layered film (Mitsubishi) having a thickness of 50 μm was used.

Comparative Example 3

A process was performed in the same manner as in Example 1, except that as the second separate film, a single-layered film (Toray) having a thickness of 75 μm was used.

Comparative Example 4

A process was performed in the same manner as in Example 1, except that as the second separate film, a double-layered film having a total thickness of 168 μm was used by laminating a single-layered film (Toray) having a thickness of 75 μm with a single-layered film (LG Chem) having a thickness of 93 μm.

Experimental Example

After the lamination process between the polarizing plate according to the Examples and the Comparative Examples and the polycarbonate film, the presence or absence of defects in the bonding surface between the polarizing plate and the polycarbonate film was evaluated, and the results are shown in the following Table 1. Furthermore, the results of attaching the optical film to the polarizing plate according to Example 1 and Comparative Example 1 are shown in the following FIG. 3. The evaluation results in the following Table 1 were evaluated based on the presence or absence of defects such as air bubbles when the bonding surface between the polarizing plate and the polycarbonate film was visually confirmed.

TABLE 1

|  | Evaluation result |
|---|---|
| Example 1 | OK |
| Example 2 | OK |
| Example 3 | OK |
| Comparative Example 1 | Occurrence of defects |
| Comparative Example 2 | Occurrence of defects |
| Comparative Example 3 | Occurrence of defects |
| Comparative Example 4 | Occurrence of defects |

As shown in the results of the following FIG. 3, when the optical film was attached to the polarizing plate according to Example 1, no air bubbles were generated on the bonding surface between the optical film and the polarizing plate. However, when the optical film was attached to the polarizing plate according to Comparative Example 1, a sagging phenomenon of the polarizing plate occurred during the process of attaching the optical film to the polarizing plate, so that it could be confirmed that air bubbles are generated on the bonding surface between the optical film and the polarizing plate.

Accordingly, the polarizing plate laminate according to an exemplary embodiment of the present application can prevent defects such as the sagging phenomenon of a polarizing plate during a process of attaching a liquid crystal panel or optical film of a liquid crystal display device to the polarizing plate by comprising a second separate film having a total thickness of more than 75 μm and 150 μm or less.

Therefore, it is possible to suppress a phenomenon in which air bubbles can be generated on the bonding surface between the liquid crystal panel or optical film of the liquid crystal display device and the polarizing plate during the process of attaching the liquid crystal panel or optical film of the liquid crystal display device to the polarizing plate.

The invention claimed is:

1. A polarizing plate laminate comprising:
   a polarizing plate;
   a first adhesive layer and a first separate film which are provided on one surface of the polarizing plate; and
   a second adhesive layer and a second separate film which are provided on the other surface of the polarizing plate,
   wherein the second separate film has a double-layered structure and has a total thickness of more than 75 μm and 150 μm or less.

2. The polarizing plate laminate of claim 1, wherein the first separate film has a thickness of 10 μm to 75 μm.

3. The polarizing plate laminate of claim 1, wherein each of the first separate film and the second separate film comprises one or more resins selected from the group consisting of a polyethylene-based resin, a polypropylene-based resin, a polyester-based resin and a polycarbonate-based resin.

4. The polarizing plate laminate of claim 1, wherein a region where the second separate film is provided on the polarizing plate is a region where a liquid crystal panel or an optical film of a liquid crystal display device is disposed.

5. A method for manufacturing a polarizing plate laminate, the method comprising:
   applying a first adhesive layer to one surface of a polarizing plate and applying a second adhesive layer to the other surface of the polarizing plate; and
   laminating a first separate film on the first adhesive layer and laminating a second separate film on the second adhesive layer, wherein the second separate film has a double-layered structure and has a total thickness of more than 75 μm and 150 μm or less.

6. The method of claim 5, wherein the first separate film has a thickness of 10 μm to 75 μm.

7. The method of claim 5, wherein each of the first separate film and the second separate film comprises one or more resins selected from the group consisting of a polyethylene-based resin, a polypropylene-based resin, a polyester-based resin and a polycarbonate-based resin.

8. The method of claim 5, wherein the laminating of the first separate film and the laminating of the second separate film are performed by a roll to roll process.

9. A method for manufacturing a liquid crystal display device, the method comprising:
  removing the first separate film from the polarizing plate laminate of claim 1; and
  attaching a liquid crystal panel or an optical film of a liquid crystal display device to the polarizing plate, such that a surface of the polarizing plate laminate from which the first separate film is removed is bonded to one surface of the liquid crystal panel or the optical film.

10. The method of claim 9, wherein the optical film comprises one or more films selected from the group consisting of an antiglare film, a hard coating film, an anti-reflection film, and an Anti-Glare & Low-Reflection (AGLR) film.

11. The method of claim 9, wherein the optical film is a polycarbonate film.

* * * * *